Jan. 8, 1935.　　　　J. L. REILLY　　　　1,987,518
SPEED CHANGING TRANSMISSION MECHANISM
Filed July 28, 1933　　2 Sheets-Sheet 2
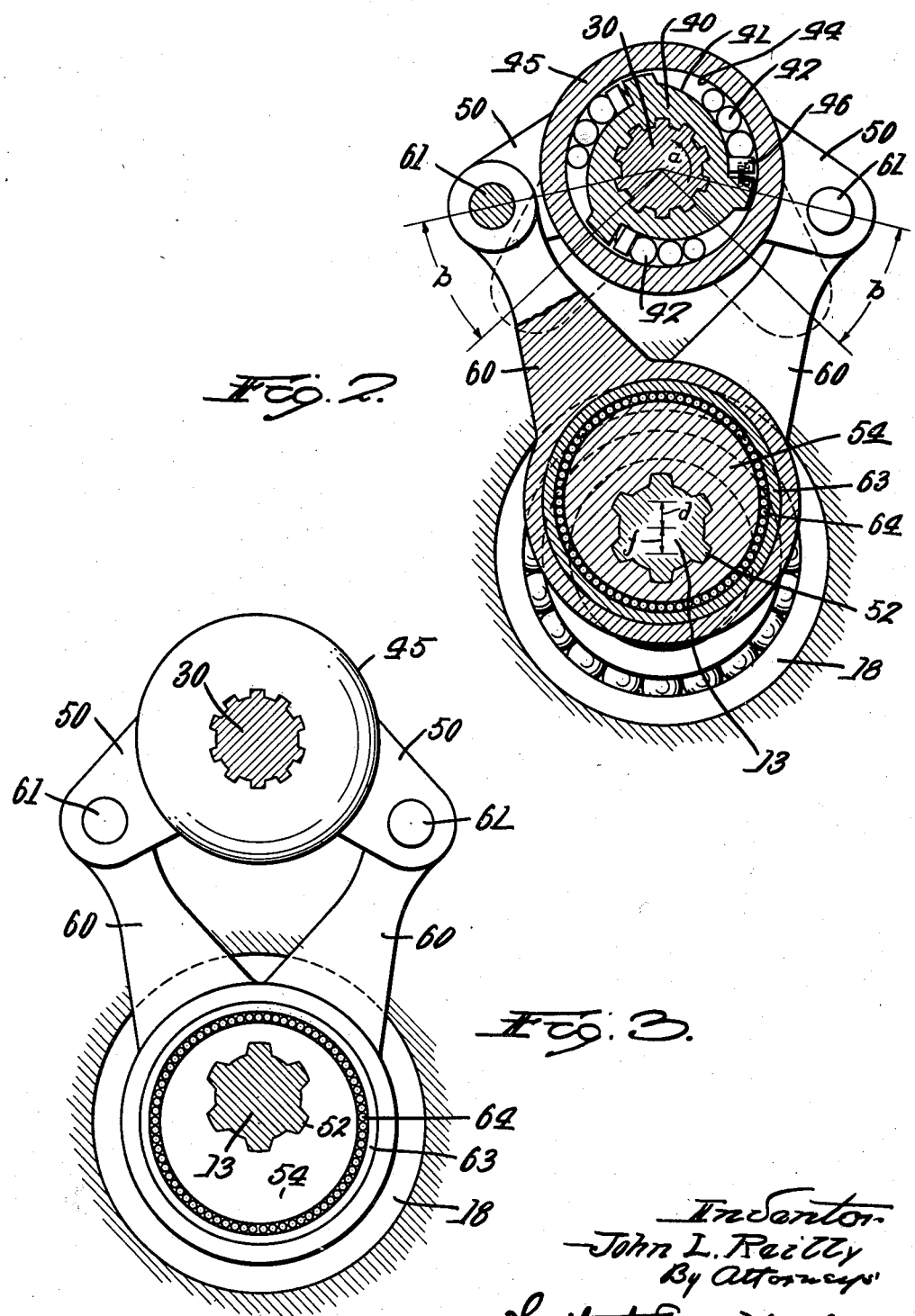

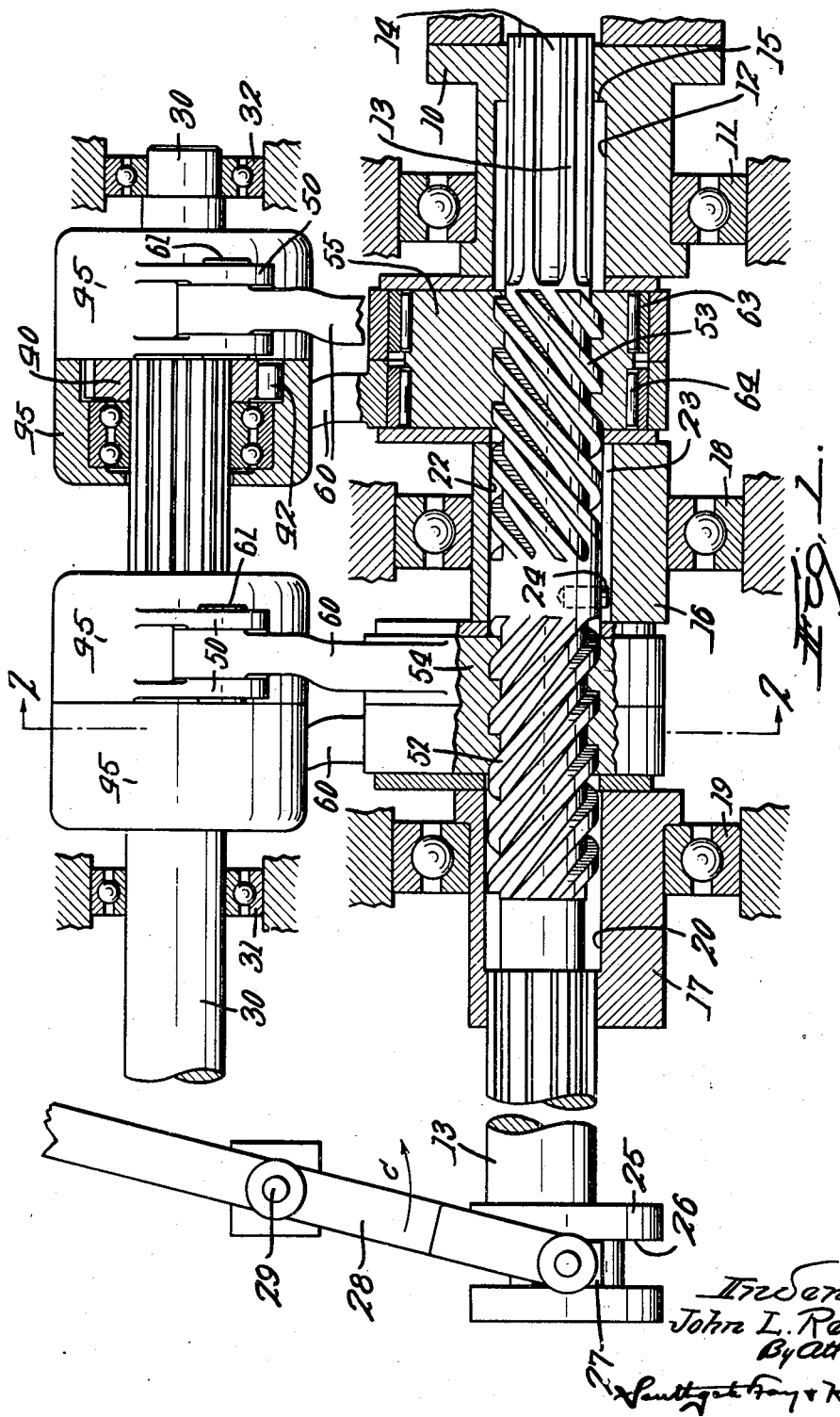

Patented Jan. 8, 1935

1,987,518

UNITED STATES PATENT OFFICE 1,987,518

SPEED CHANGING TRANSMISSION MECHANISM

John L. Reilly, Springfield, Vt.

Application July 28, 1933, Serial No. 682,613

2 Claims. (Cl. 74—571)

This invention relates to mechanism for transmitting rotary motion and for selectively varying the speed of the driven member. Such mechanism is applicable for driving automobiles or for any other purpose where a variation in speed ratio between a driving and a driven member is desired.

It is the general object of my invention to provide an improved transmission mechanism by the use of which a smooth and continuous or progressive speed variation between a driving and a driven member may be obtained.

A further object is to provide a construction in which the end thrust of the associated parts will be effectively counterbalanced, so that no unbalanced endwise forces will require counteraction.

More specifically, I provide a construction in which power is transmitted through compound eccentrics, and I provide means by which said compound eccentrics may be conveniently adjusted during the operation of the mechanism, thereby varying the amount of eccentric throw and permitting the placing of the eccentric members in neutral position when desired.

My invention further relates to arrangements and combinations of parts which will be hereinafter described and more particularly pointed out in the appended claims.

A preferred form of the invention is shown in the drawings, in which

Fig. 1 is a plan view, partly in section, showing my improved transmission mechanism;

Fig. 2 is a sectional elevation, taken along the line 2—2 in Fig. 1, and

Fig. 3 is a view similar to Fig. 2 but showing the eccentric members adjusted to neutral position.

Referring to the drawings, my improved transmission mechanism comprises a driving member 10 (Fig. 1) rotatable in an anti-friction bearing 11 and having an eccentrically positioned recess 12 to receive one end of a speed-adjusting shaft 13. The shaft 13 is provided with a series of straight splines 14 extending through a broached opening in the end wall 15 of the driving member 10.

Additional bearing members 16 and 17 are supported in bearings 18 and 19 aligned with the bearing 11. The bearing member 17 has an eccentric recess 20 to receive a portion of the shaft 13 and also has the same straight splined connection between a portion of the shaft and the outer end wall of the member 17. The bearing member 16 has an eccentric recess 22 extending therethrough and also has a keyway 23 at one side to receive a pin 24 in the shaft 13.

The driving member 10 and end bearing member 17 are maintained in definite angular relation by the straight splines on the shaft 13, and the intermediate bearing member 16 is maintained in the same angular relation by the keyway 23 and pin 14. It will be noted, however, that the driving member 10 and bearing members 16 and 17 are so connected to the shaft 13 that free axial movement of the shaft 13 is permitted.

A flange or enlargement 25 is formed at one end of the shaft 13 and is concentric with the driving and bearing members 10, 16 and 17. This flange 25 is grooved as indicated at 26 to receive blocks 27 pivoted in the end of a forked hand lever 28, which in turn is mounted on a fixed pivot 29. The shaft 13 may thus be manually adjusted axially by the hand lever 28.

A driven shaft 30 is rotatable in fixed bearings 31 and 32 and is disposed in parallel relation to the axis of the driving and bearing members 10, 16 and 17. Clutch members 40 (Fig. 2) are splined to the driven shaft 30 and are provided with a plurality of outwardly curved cam surfaces 41, adapted to be engaged by balls or rolls 42 which are disposed between the cam surfaces 41 and the cylindrical inner surfaces 44 of outer clutch members 45. The surfaces 41 and 44 cooperate to form ball-holding recesses tapering gradually in the direction of rotation of the driven shaft 30, as indicated by the arrow $a$ in Fig. 2.

Spring followers 46 may be provided to assist the seating of the balls or rolls 42, which balls or rolls may be of successively reduced diameters corresponding to the taper of the ball-holding recesses.

The outer clutch members 45 are free to move about the axis of the driven shaft 30 and are provided with arms 50. The members 45 are assembled in reversed pairs, so that the arms 50 extend outward at opposite sides of the shaft 30.

The speed-changing shaft 13 (Fig. 1) is provided with right and left-hand steep-pitch helical screw-threads 52 and 53 which are threaded into eccentric or crank members 54 and 55. These members 54 and 55 are mounted between the driving and bearing members 11, 18 and 19 and are firmly held from axial movement by said members.

Links 60 are pivoted at 61 to the arms 50 and at their lower ends are provided with large circular openings to receive hardened steel bearing rings 63, which rings are centered on the eccentric or crank members 54 and 55 by a plurality of rolls 64.

Having described the details of construction of my improved transmitting mechanism, the method of operation thereof is as follows:

Assuming that the parts are as shown in Figs. 1 and 2, it will be seen that the crank members 54 and 55 are at the maximum eccentricity with respect to the axis of the driving member 10 and bearing members 16 and 17. So long as the shaft 13 remains in fixed axial position, rotation of the driving member 10 will cause the members 54 and 55 to act exactly the same as ordinary crank-pins and the arms 50 will be oscillated as indicated by the arrows $b$ in Fig. 2, thus causing the outer clutch members 45 of an associated pair to have corresponding oscillating movements but in reverse directions.

When the right-hand arm 50 in Fig. 2 is moving upward to cause the one-way clutch to engage and advance the shaft 30 in the direction of the arrow $a$, the left-hand arm 50 will be moving in the reverse or clockwise direction and the corresponding clutch will be inoperative. Consequently the two clutch members of an associated pair alternately advance the shaft 30 one step each in the member 10.

If the driving member 10 rotates relatively fast, the rotation of the driven shaft 30, although actually intermittent, will be practically continuous, owing to the very slight intervals between forward impulses.

If a reduction in speed of the driven shaft 30 is desired, the handle 28 is moved in the direction of the arrow $c$ in Fig. 1 to slide the shaft 13 to the right. As the shaft 13 is splined and keyed to the driving member 10 and bearing members 16 and 17, the shaft cannot turn in said bearing members and the endwise movement of the shaft can only take place in conjunction with corresponding rotational movements of the eccentric or crank members 54 and 55.

The helical threads 52 and 53 are of such steep pitch that the usual holding action of the nut does not occur and the eccentric members may be turned by reasonable endwise pressure on the shaft 13.

In the position of the parts shown in Fig. 2, the eccentricity $d$ of the crank member 54 is added to the eccentricity $f$ of the shaft 13, thus giving the maximum eccentricity. The eccentric distances $d$ and $f$ are preferably equal.

It is obvious that any relative rotation of the crank members 54 and 55 about the axis of the shaft 13 will reduce the net or total eccentricity, and that when the members 54 and 55 have been given an angular adjustment of 180°, the eccentricity of the crank members 54 and 55 and the shaft 13 will offset each other, so that the crank members will be in neutral position and in alignment with the axis of the driving member 10 and bearing members 16 and 17 as shown in Fig. 3.

As the crank members 54 and 55 are angularly adjusted equally but in opposite directions, the impulses derived from these crank members will be applied at different times to the driven shaft 30 except when set for maximum throw. For slower speeds there will be four impulses for each revolution of the driving member 10, which impulses will be more or less equally spaced according to the eccentric setting.

I am thus able to secure a continuous and progressive speed variation from maximum to zero by a single continuous movement of the hand lever 28 in one direction and a similar progressive speed increase by a reverse movement of the lever 28.

By providing the right and left-hand helical threads 52 and 53, I counterbalance the endwise thrust caused by the driving of the crank members 54 and 55 through these helical screw threads. The end thrusts of the members 54 and 55 thus offset each other and there is no unbalanced force tending to move the shaft 13 axially. Consequently the shaft remains naturally in any axial position to which it is adjusted, and no unbalanced end thrust need be overcome in adjusting the shaft axially to vary the speed.

While I have shown two sets of clutch members, it will be obvious that as many additional sets may be provided as may be necessary to transmit the required power, it being desirable, however, that an even number of sets be used so that all end thrusts may be counterbalanced.

Having thus described my invention and the advantages thereof, I do not wish to be limited to the details herein disclosed, otherwise than as set forth in the claims, but what I claim is:—

1. Variable eccentric transmitting mechanism comprising a continuously rotated driving member, a fixed bearing for said member, a speed changing shaft of circular cross section slidable axially in a longitudinal cylindrical opening in said driving member of corresponding circular cross section, said longitudinal opening being positioned eccentrically with respect to the axis of said driving member, means to prevent relative rotation of said driving member and said speed changing shaft, said shaft having steep-pitch helical threads formed in a cylindrical portion thereof and encircling said shaft, a crank member mounted on said threaded portion of said speed changing shaft and having an eccentrically positioned cylindrical opening therein threaded to receive and engage said helical threads, means to prevent axial movement of said crank member, and means to move said speed changing shaft axially relative to said crank member along said eccentric cylindrical opening, thereby causing said crank member to be turned about the axis of said speed changing shaft and relative to said driving member, thereby varying the effective throw of said crank member.

2. Variable eccentric transmitting mechanism comprising a continuously rotated driving member, a fixed bearing for said member, a speed-changing shaft slidable axially in said driving member and positioned eccentrically with respect to the axis of said member, means to prevent relative rotation of said driving member and speed-changing shaft, said shaft having two sets of steep-pitch helical threads formed on spaced portions thereof and of opposite hands, crank members mounted on said speed-changing shaft and each having an eccentrically positioned opening therein threaded to receive and engage one set of said helical threads, means to prevent axial movement of said crank members, and means to move said speed-changing shaft axially relatively to said crank members, thereby turning said crank members in opposite directions relative to said speed-changing shaft and driving member and thus varying the effective throw of said crank members while counterbalancing the end thrusts between said speed-changing shaft and said crank members in all relative positions thereof.

JOHN L. REILLY.